US012258243B2

(12) United States Patent
Koyahata et al.

(10) Patent No.: US 12,258,243 B2
(45) Date of Patent: Mar. 25, 2025

(54) ASSEMBLY METHOD FOR CRANE

(71) Applicant: KOBELCO CONSTRUCTION MACHINERY CO., LTD., Hiroshima (JP)

(72) Inventors: Akira Koyahata, Hyogo (JP); Dairo Matsui, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 245 days.

(21) Appl. No.: 17/996,823

(22) PCT Filed: Apr. 14, 2021

(86) PCT No.: PCT/JP2021/015512
§ 371 (c)(1),
(2) Date: Oct. 21, 2022

(87) PCT Pub. No.: WO2021/220819
PCT Pub. Date: Nov. 4, 2021

(65) Prior Publication Data

US 2023/0202808 A1 Jun. 29, 2023

(30) Foreign Application Priority Data

Apr. 27, 2020 (JP) ................................ 2020-078723

(51) Int. Cl.
*B66C 23/00* (2006.01)
*B66C 23/34* (2006.01)
*B66C 23/42* (2006.01)

(52) U.S. Cl.
CPC ............ *B66C 23/348* (2013.01); *B66C 23/42* (2013.01)

(58) Field of Classification Search
CPC ....... B66C 23/06; B66C 23/26; B66C 23/344; B66C 23/348; B66C 23/42; B66C 23/66; B66C 23/68
See application file for complete search history.

(56) References Cited

U.S. PATENT DOCUMENTS

2010/0243595 A1* 9/2010 Walker .................... B66C 23/26 212/294
2012/0175333 A1* 7/2012 Pech ....................... B66C 23/26 212/177

(Continued)

FOREIGN PATENT DOCUMENTS

JP 2007-290782 A 11/2007
JP 2007-290790 A 11/2007

(Continued)

OTHER PUBLICATIONS

International Search Report Issued Jun. 15, 2021, in PCT/JP2021/015512, 3 pages.

(Continued)

*Primary Examiner* — Emmanuel M Marcelo
(74) *Attorney, Agent, or Firm* — Oblon, McClelland, Maier & Neustadt, L.L.P.

(57) ABSTRACT

Provided is an assembly method for a crane, by which method a crane including a strut can be assembled easily. The assembly method for the crane includes a strut coupling step of coupling a base end of a strut, a cylinder connecting step of extending a cylinder unit having one end supported by the strut, the cylinder unit being capable of extending/contracting, to connect the other end of the cylinder unit to the boom, a strut raising step of causing the cylinder unit to contract to raise the strut, and a strut supporting step of stretching a stretching member, such as a rear side guy line (Continued)

or a luffing cable, between a front end of the strut and a base end of the boom to support the strut in a raised state.

5 Claims, 6 Drawing Sheets

(56) References Cited

U.S. PATENT DOCUMENTS

| | | | | |
|---|---|---|---|---|
| 2014/0061144 | A1 | 3/2014 | Terauchi | |
| 2019/0106303 | A1* | 4/2019 | Kuninaga | B66C 23/42 |
| 2019/0185297 | A1* | 6/2019 | Kobatake | B66C 23/42 |

FOREIGN PATENT DOCUMENTS

| | | | |
|---|---|---|---|
| JP | 2012-116607 | A | 6/2012 |
| JP | 2013-49499 | A | 3/2013 |
| JP | 2014-43318 | A | 3/2014 |
| JP | 2014-65577 | A | 4/2014 |
| JP | 2017-154845 | A | 9/2017 |
| JP | 2019-69838 | A | 5/2019 |
| JP | 2020-132298 | A | 8/2020 |

OTHER PUBLICATIONS

Extended European Search Report Issued Aug. 30, 2023 in European Application 21797146.4, 7 pages.

* cited by examiner

ASSEMBLY METHOD FOR CRANE

TECHNICAL FIELD

The present invention relates to an assembly method for a crane.

BACKGROUND ART

A luffing jib crane, a tower crane, or the like is known as a large crane. Such a large crane includes a boom, a jib supported on a front end of the boom, and a strut that causes the jib to rise and fall. In a site where the large crane is used, the boom, the jib, and the strut are assembled into the large crane to be used.

In general, a large crane is assembled in the following manner: an operator joins together a lower boom and an intermediate boom, which make up a boom, to construct the boom, attaches a strut to a front end of the boom, and then attaches an end jib on a base end side, an intermediate jib, and an end jib on a front end side, which make up a jib, in sequence to the front end of the boom. In this assembling work, the boom and the jib can be assembled in a substantially horizontal position. The strut, however, needs to be raised substantially vertically against the boom after being attached to the front end of the boom. This gives work of assembling the strut extra difficulty that is not included in work of assembling the boom and the jib.

A crane capable of easily raising a strut is disclosed in Patent Literature 1. This crane is provided with a strut rotating mechanism including a rod-like member having one end rotatably connected to a front end of the strut and a linear motion device. The linear motion device applies a force acting in a direction of pulling the other end of the rod-like member toward a side opposite to the one end along the longitudinal direction of the bar-like member.

The crane described in Patent Literature 1 includes an assembly device and a specific link rod. The assembly device includes a cylinder, a link plate, and a plurality of link rods that are disposed on a support frame on a front end of a boom. The specific link rod has a toggle mechanism that connects a front end of a rear strut to the link plate and that can extend and contract. In a process of assembling this crane, extension/contraction of the cylinder causes the link plate and the plurality of link rods to work so as to rotate the rear strut forward and backward, which puts the rear strut in a position in which the specific link rod having the toggle mechanism stretches a base end side pendant.

Assembling the crane described in Patent Literature 1 requires the assembly device having the link mechanism and the specific link rod having the toggle mechanism. The structure of the crane is therefore complicated, which raises a concern that the crane may have problems of backlash, malfunctioning, etc., caused by manufacturing errors, assembly errors, time-dependent deterioration of components, and the like. Further, assembling work is not easy and assembling the crane may take greater costs. Hence easier assembling work and cost reduction are in demand.

CITATION LIST

Patent Literature

Patent Literature 1: JP 2014-043318 A

SUMMARY OF INVENTION

An object of the present invention is to provide an assembly method for a crane by which method a crane including a strut can be assembled easily.

The present invention provides an assembly method for a crane which includes: a lower travelling body; an upper slewing body on the lower travelling body, the upper slewing body being rotatable within a plane parallel to a surface on which the lower travelling body travels; a boom having a base end coupled to the upper slewing body, the boom being capable of rising and falling with respect to the plane parallel to the surface; a jib having a base end coupled to a front end of the boom, the jib having a load-suspending cable suspended from a front end of the jib and being capable of rising and falling with respect to the boom; a front strut having a base end coupled to a base end side of the jib or a front end side of the boom, the front strut having a front end side connected to the front end side of the jib via a front side guy line; and a rear strut having a base end coupled to the base end side of the jib or the front end side of the boom, the rear strut having a front end side connected to a base end side of the boom via a rear side guy line or a luffing cable. The method includes: a strut coupling step of coupling the base end of the rear strut and coupling the base end of the front strut; a cylinder connecting step of extending a cylinder unit having one end connected to the rear strut, the cylinder unit being capable of extending/contracting, to connect the other end of the cylinder unit to the boom; a rear strut raising step of causing the cylinder unit to contract to raise the rear strut; and a line tensioning step of stretching the rear side guy line or the luffing cable between the front end side of the rear strut and the base end side of the boom and giving tension to the rear side guy line or the huffing cable.

DESCRIPTION OF EMBODIMENTS

An embodiment of the present invention will hereinafter be described in detail with reference to the drawings as necessary. In the following description, a “front end” of a boom and of a jib refers to an end of the boom and of the jib that is located farther from an upper slewing body when the boom and the jib are extended. A “front end” of a strut refers to an end of the strut that is located farther from the front end of the boom. A “base end” of the boom and of the jib refers to an end of the boom and of the jib that is located closer to the upper slewing body when the boom and the jib are extended. A “base end” of the strut refers to an end of the strut that is located closer to the front end of the boom. A “belly side” means the underside (the side closer to the ground) in the vertical direction of the boom, the jib, and the strut that are in a state of being laid flat. A "back side" means the upper side in the vertical direction of the boom, the jib, and the strut that are in a state of being extended and laid flat.

Crane

Figure 1:
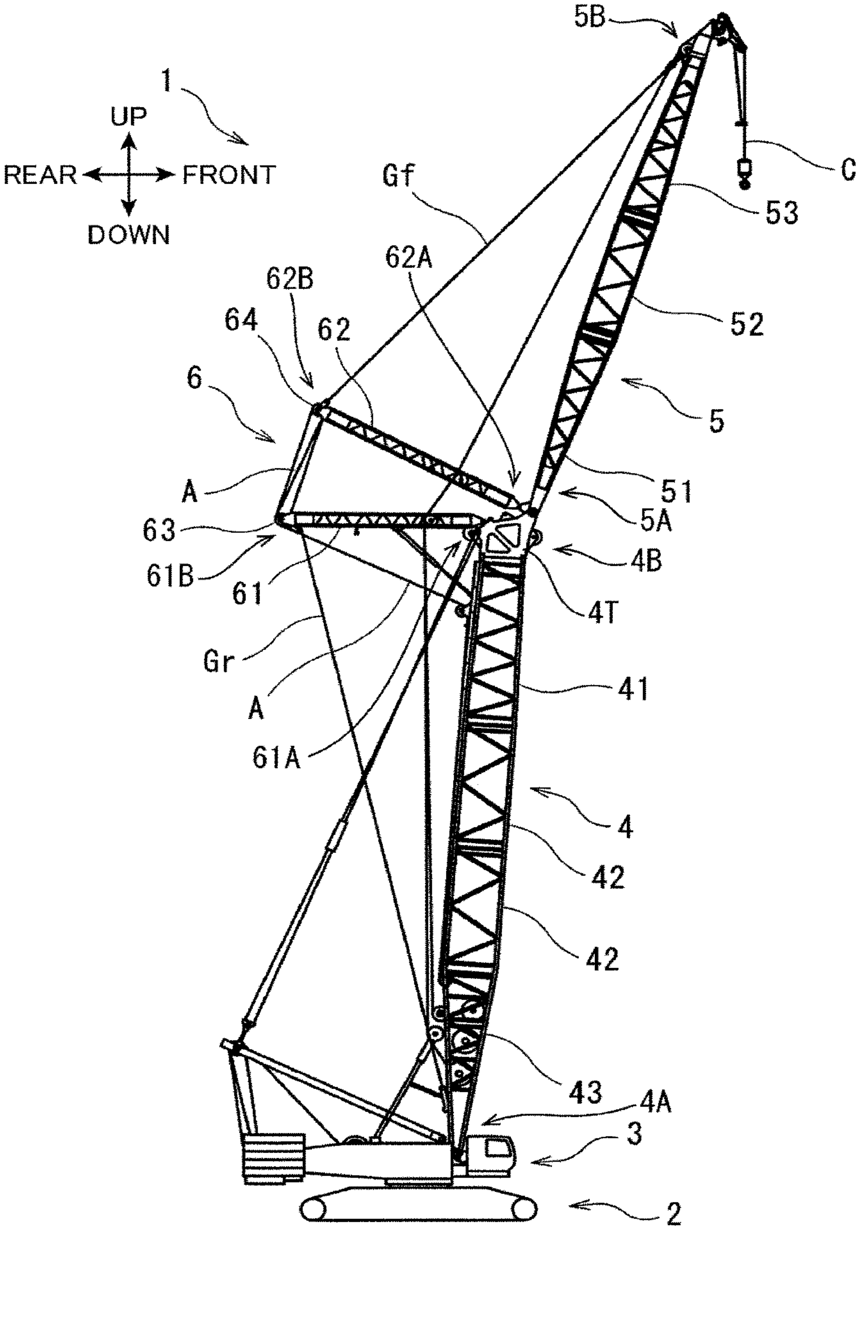
FIG. 1 is a schematic side view of a crane assembled by an assembly method for a crane according to an embodiment of the present invention.

FIG. 1 is a schematic side view of a crane 1 assembled by an assembly method for a crane according to an embodiment of the present invention.

The crane 1 is a luffing jib crane including a lower travelling body 2, an upper slewing body 3, a boom 4, a jib 5, and a strut 6. The upper slewing body 3 is slewably mounted on the lower travelling body 2 in a plane parallel to a surface on which the lower travelling body 2 travels (a travelling surface G or the ground). The boom 4 is disposed on the upper slewing body 3 so as to be capable of rising and falling in the front-rear direction (swinging to fall down frontward and rise up rearward). The jib 5 is coupled to a front end of the boom 4 so as to be capable of rising and falling in the front-rear direction. The strut 6 is placed on the front end of the boom 4.

Lower Travelling Body

The lower travelling body 2 includes a pair of right and left crawlers and the like, which serve as a travelling device, and can travel on the travelling surface G in any given direction.

Upper Slewing Body

The upper slewing body 3 is mounted on the lower travelling body 2, and is slewably supported by the lower travelling body 2 in the plane parallel to the travelling surface G on which the lower travelling body 2 travels. The upper slewing body 3 includes a cabin for an operator, a boom luffing winch that causes the boom 4 to rise and fall, a jib luffing winch that causes the jib 5 to rise and fall, and a hoisting winch that feeds and hoists a load-suspending rope suspended from a front end of the jib 5. The "plane parallel to the surface" refers not only to the case where the plane and the surface are completely parallel to each other but also to a case where the plane is slightly tilted against the surface on which the lower travelling body 2 travels because of design tolerance, manufacturing error, or the like of the lower travelling body 2 and the upper slewing body 3.

Boom

The boom 4 includes a boom base end 4A coupled to the upper slewing body 3, and a boom front end 4B disposed opposite to the boom base end 4A, and is supported by the upper slewing body 3 so as to be capable of rising and falling vertically with respect to a rotation surface of the upper slewing body 3. In this embodiment, the boom 4 can be divided into a boom top 4T coupled to the jib 5, the boom top 4T being on a front end side, an upper boom 41 coupled to the boom top 4T, one or a plurality of intermediate booms 42 making up a straight body part at the center in the longitudinal direction of the boom 4, and a lower boom 43 of a tapered shape that is coupled to the upper slewing body 3. The boom top 4T makes up the boom front end 4B, and the lower boom 43 makes up the boom base end 4A.

The upper boom 41, the lower boom 43, and the intermediate boom 42 are each formed into a substantially square cylindrical shape and have, for example, a lattice structure. The lattice structure includes four boom main beams (pillars or main pillars) arranged to be at vertices of a virtual square, respectively, in a cross-sectional view perpendicular to the longitudinal direction, and a plurality of boom auxiliary beams (lattices or diagonal members) arranged so as to connect adjacent boom main beams to each other to form a plurality of triangles, quadrangles, or the like having a base formed of the boom main beams. The upper boom 41 and the lower boom 43 may have plate-like reinforcing members in place of the plurality of boom auxiliary beams. The upper boom 41, the lower boom 43, and the intermediate boom 42 are assembled into a single boom 4 by connecting ends of their boom main beams to each other. The boom top 4T is substantially a rectangular parallelepiped, and has a pair of left and right plate-like parts.

Jib

The jib 5 includes a jib base end 5A coupled to the front end of the boom 4, and a jib front end 5B disposed opposite to the jib base end 5A and supporting a load-suspending cable C. Similarly to the boom 4, the jib 5 is supported by the boom 4 so as to be capable of rising and falling vertically with respect to the rotation surface of the upper slewing body 3, and has the load-suspending cable C suspending from the jib front end 5B. The jib 5 includes a lower jib 51 coupled to the boom 4, one or a plurality of intermediate jibs 52 making up a straight body part at the center in the longitudinal direction of the jib 5, and an upper jib 53 on a front end side. The lower jib 51 and the upper jib 53 are each tapered. The lower jib 51 makes up the jib base end 5A, and the upper jib 53 makes up the jib front end 5B.

Similarly to the boom 4, the lower jib 51, the intermediate jib 52, and the upper jib 53 are each formed into a substantially square cylindrical shape and have, for example, a lattice structure. The lattice structure includes four jib main beams arranged to be at vertices of a virtual square, respectively, in a cross-sectional view perpendicular to the longitudinal direction, and a plurality of jib auxiliary beams arranged so as to connect adjacent jib main beams to each other to form a plurality of triangles, quadrangles, or the like having a base formed of the jib main beams. The lower jib 51 and the upper jib 53 may have plate-like reinforcing members in place of the plurality of jib auxiliary beams. The lower jib 51, the intermediate jib 52, and the upper jib 53 are assembled into a single jib 5 by connecting ends of their jib main beams to each other.

Strut

The strut 6 has its base end coupled to a base end side of the jib 5 or a front end side of the boom 4. In this embodiment, the strut 6 is described as each of two struts: a rear strut 61 coupled to the boom front end 4B of the boom 4 and located closer to the boom 4 at the back side of the boom 4 and the jib 5; and a front strut 62 coupled to the jib base end 5A of the jib 5 and located closer to the jib 5 at the back side of the boom 4 and the jib 5.

Each strut 6 (each of the front strut 62 and the rear strut 61) is formed into a substantially square cylindrical shape, and has a frame of a lattice structure similarly to the boom 4 and the jib 5, or has a box shape. For example, each strut 6, i.e., single strut may be assembled by connecting together a lower strut part and an upper strut part, which can be separated from each other, or may be formed as an integral structure that is not dividable.

More specifically, the structure of the strut 6 includes a strut base end coupled rotatably to the jib base end 5A or the boom front end 4B, and a strut front end located opposite to the strut base end and connected to the jib front end 5B via at least a front side guy line Gf.

The front strut 62 includes a front strut base end 62A coupled rotatably to the jib base end 5A or the boom front end 4B, and a front strut front end 62B located opposite to the front strut base end 62A and connected to the jib front end 5B via the front side guy line Gf.

The rear strut 61 includes a rear strut base end 61A coupled rotatably to the jib base end 5A or the boom front end 4B at the rear of the front strut base end 62A, and a rear strut front end 61B located opposite to the rear strut base end 61A and connected to the front strut front end 62B via a luffing cable A (connection member).

Guy Line

A guy line includes a rear side guy line Gr stretched between the boom base end 4A of the boom 4 and the rear strut front end 61B of the rear strut 61, and the front side guy line Gf stretched between the jib front end 5B of the jib 5 and the front strut front end 62B of the front strut 62.

The rear side guy line Gr and the front side guy line Gf each have a plurality of guy links. Each of the rear side guy line Gr and the front side guy line Gf may be partially formed of a flexible wire cable or the like. The guy link is not limited to a specific type of guy link, and, for example, may have the following configuration.

The guy link includes a rod and a link plate connected to one end of the rod. The guy link is made of a steel material or the like having sufficient tensile strength. The rod may be provided as a rod-shaped member (including a band-shaped member or cylindrical member) having both ends on which through-holes are formed respectively, and a middle part connecting both ends. Preferably, the rod is configured such that both ends are larger in width than the middle part in a direction perpendicular to the axial direction of the through-holes so that when the rod is placed on a flat ground, the middle part is kept elevated from the ground. The rod of such a configuration makes storing the guy link in a storage unit easy. Such a rod can be formed by joining a member having a through-hole to both ends of a bar or a sufficiently rigid wire cable.

The link plate has connection holes formed respectively on its both ends, the connection holes being engaged with link pins put through the through-holes of the rod. One guy link is formed by connecting one end of the link plate to one end of the rod. By connecting the other end of the rod of a different guy link to the other end of the link plate of the one link, the one guy link can be coupled to the different guy link.

Luffing Cable

The luffing cable A is stretched between a sheave 63 disposed on the front end (rear strut front end 61B) of the rear strut 61 and a sheave 64 disposed on the front end (front strut front end 62B) of the front strut 62. One end of the luffing cable A is connected to the jib luffing winch disposed on the boom 4, and the jib luffing winch feeds and takes up the luffing cable A. Feeding and taking up the luffing cable A adjusts an angle between the rear strut 61 and the front strut 62, which causes the front strut 62 and the jib 5 to rotate together via the front side guy line Gf. As a result, an angle of the jib 5 against the boom 4 is adjusted (the jib 5 rises and falls) In another embodiment, the angle of the jib 5 against the boom 4 may be adjusted in the following manner. The rear strut front end 61B and the front strut front end 62B are coupled to each other by a strut coupling member (connection member), which is not illustrated, and the luffing cable A connected to the rear strut front end 61B is fed and taken up to cause the rear strut 61 and the front strut 62 with their angles against each other being fixed to rotate. As a result, the rear strut 61, the front strut 62, and the jib 5 rotate together via the front side guy line Gf to adjust the angle of the jib 5 against the boom 4.

Specifically, the luffing cable is stretched between the boom base end 4A of the boom 4 and the rear strut front end 61B of the rear strut 61 (not illustrated). In this case, the guy line does not include the rear side guy line Gr stretched between the boom base end 4A of the boom 4 and the rear strut front end 61B of the rear strut 61, and the rear strut front end 61B of the rear strut 61 is connected to the boom base end 4A of the boom 4 via the luffing cable. In addition, the front strut front end 62B of the front strut 62 and the rear strut front end 61B of the rear strut 61 are connected to each other, for example, by the strut coupling member formed of a link member, and the front strut 62, the rear strut 61, and the link member rise and fall together to determine the angle of the jib 5 against the boom 4. In other words, the angle between the front strut 62 and the rear strut 61 is not adjusted but is kept constant, in which state the jib luffing winch feeds and takes up of the luffing cable. This causes the front strut 62 and the rear strut 61 to rise and fall simultaneously in the same direction, thus determining the angle of the jib 5 against the boom 4.

Assembly Method for Crane

An assembly method for a crane according to the embodiment of the present invention is an assembly method for the crane 1 which includes: the lower travelling body 2 capable of travelling on the travelling surface G; the upper slowing body 3 on the lower travelling body 2, the upper slewing body 3 being slewably supported by the lower travelling body 2 within the plane parallel to the travelling surface G; the boom 4 having the boom base end 4A coupled to the upper slewing body 3, the boom 4 being supported by the upper slewing body 3 so as to be capable of rising and falling with respect to the plane parallel to the travelling surface G; the jib 5 having the jib base end 5A coupled to the boom front end 4B of the boom 4 and the jib front end 5B from which the load-suspending cable C suspends, the jib 5 being supported by the boom 4 so as to be capable of rising and falling; and at least one strut 6 having the strut base end coupled rotatably to the jib base end 5A or the boom front end 4B, the at least one strut having the strut front end located opposite to the strut base end, the strut front end being connected to the jib front end 5B via at least the front side guy line Gf. In particular, in this embodiment, the strut 6 includes the rear strut 61 and the front strut 62.

The assembly method for the crane 1 includes a strut coupling step, a cylinder connecting step, a rear strut raising step (strut raising step), and a strut supporting step (line tensioning step).

In the strut coupling step, the rear strut base end 61A of the rear strut 61 is coupled and the front strut base end 62A of the front strut 62 is coupled. In the cylinder connecting step, a cylinder unit 65 having one end 65S connected to the rear strut 61, the cylinder unit 65 being capable of extending/contracting, is extended to connect the other end 65T of the cylinder unit 65 to the boom 4. In the rear strut raising step, the cylinder unit 65 is caused to contract to raise the rear strut 61. In the rear strut supporting step, the rear side guy line Gr or the luffing cable is stretched between the rear strut front end 61B of the rear strut 61 and the boom base end 4A of the boom 4, and is given tension to support the rear strut 61 in the raised state.

Coupling of the front strut 62 and the rear strut 61 is carried out in such a way that both struts are coupled to the jib base end 5A of the jib 5 or to the boom front end 4B of the boom 4, or in such a way that one of the struts is connected to the jib base end 5A of the jib 5 and the other of the struts is connected to the front base end 4A 4B of the boom 4. In this embodiment, an example in which the front strut 62 is coupled to the jib base end 5A of the jib 5 as the rear strut 61 is coupled to the boom front end 4B of the boom 4 will be described.

It is preferable that the assembly method for the crane include, before the strut coupling step, a preparation step of preparing the boom top 4T, the lower jib 51, and the strut 6 while assembling the boom 4 with boom members not including the boom top 4T, and a jib coupling step of coupling the lower jib 51, together with the boom top 4T, to the upper boom 41 of the boom 4. It is also preferable that the assembly method for the crane include a front strut raising step after the rear strut supporting step.

Preparation Step

In the preparation step, the lower boom 43, the intermediate boom 42, and the upper boom 41 are assembled to form the boom 4 not including the boom top 4T. A method of forming the boom 4 is not limited to a particular method, and the boom 4 may be formed by a known method.

Figure 2:
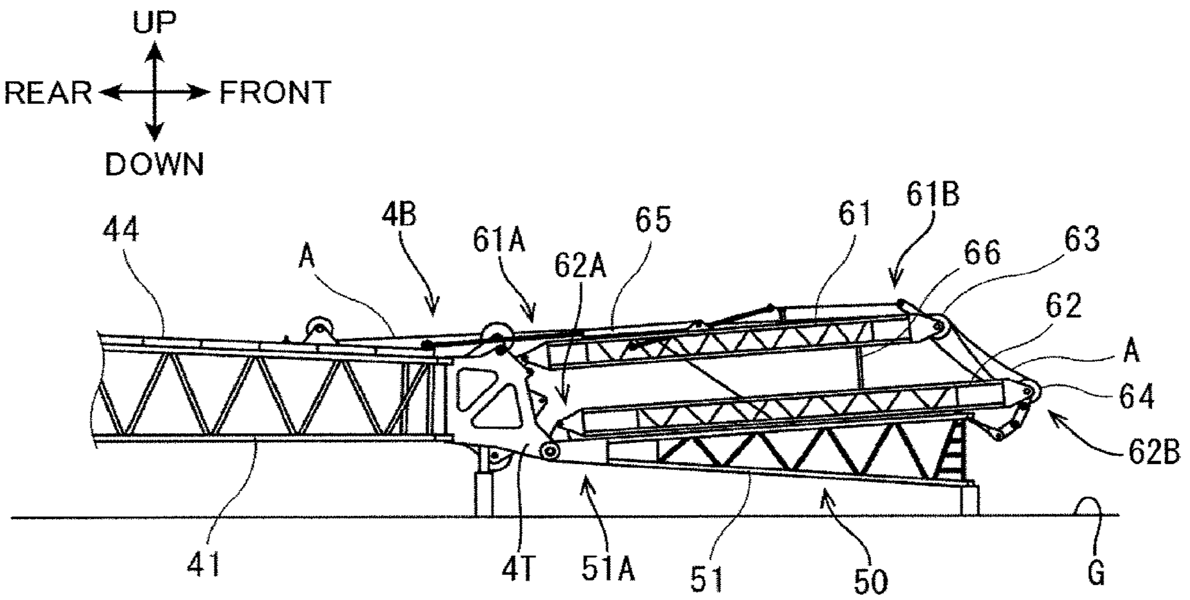
FIG. 2 is a schematic side view showing one step of the assembly method for the crane according to the embodiment of the present invention.

The preparation step is executed to prepare the boom top 4T connected to a front end of the upper boom 41 in the assembled boom 4, the lower jib 51, and the front strut 62 and the rear strut 61 connected to a base end of the lower jib 51 or the front end of the upper boom 41. How these members are prepared is not specified in particular. The boom top 4T, the lower jib 51, the front strut 62, and the rear strut 61 may be prepared individually or the front strut 62, the rear strut 61, the boom top 4T, and the lower jib 51 may be prepared in the form of an integrated unit 50 (FIG. 2). It is preferable in this case that the integrated unit 50 be prepared as a unit in which the lower jib 51 is connected in advance to the boom top 4T, the front strut 62 is placed on the hack side (upper side) of the lower jib 51, and the rear strut 61 is further placed on the back side of the front strut 62 (FIG. 2). By preparing the integrated unit 50 assembled in such a state, the front strut 62, the rear strut 61, the boom top 4T, and the lower jib 51 can be transported as the integrated unit 50, which reduces transportation cost.

When the front strut 62, the rear strut 61, the boom top 4T, and the lower jib 51 are prepared as the integrated unit 50, it is preferable to interpose a support 66 between the front strut 62 and the rear strut 61 so that the front strut 62 can support the rear strut 61. The rear strut 61 being supported by the support 66 allows stable transportation of the integrated unit 50. It is also preferable that the support 66 have a length (height) that when the base end (rear strut base end 61A) of the rear strut 61 is connected to the boom top 4T, allows a straight line extending from the rear strut base end 61A of the rear strut 61 to the rear strut front end 61B can form an elevation angle against the horizontal direction.

Jib Coupling Step

In the jib coupling step, with the lower jib 51 having the front strut 62 and the rear strut 61 placed on the back side, the boom top 4T of the integrated unit 50 is coupled to the front end of the upper boom 41. This couples the lower jib 51 to the boom 4 (FIG. 2).

The integrated unit 50 is attached to the front end of the upper boom 41, using, for example, an assembling crane. It is preferable that, to execute the jib coupling step with the lower jib 51 being lifted horizontally, the front end of the boom 4 be kept lifted slightly during execution of the step.

When the lower jib 51, the front strut 62, and the rear strut 61 are prepared individually or the lower jib 51, the front strut 62, and the rear strut 61 are prepared in the form of the integrated unit 50, the above step of coupling the integrated unit 50 to the upper boom 41 may be executed after the strut coupling step, which will be described later.

Strut Coupling Step

In the strut coupling step in this embodiment, the rear strut base end 61A of the rear strut 61 is coupled to the boom front end 4B of the boom 4, and the front strut base end 62A of the front strut 62 is coupled to the jib base end 5A of the jib 5 (FIG. 2).

In the above preparation step, in a state where the lower jib 51 is coupled to the boom top 4T in advance, the rear strut 61 is on the front strut 62 placed on the lower jib 51. This allows the level of the rear strut base end 61A of the rear strut 61 to be brought closer to the level of a coupling part of the boom top 4T, which makes coupling of the rear strut 61 to the boom top 4T easier. Meanwhile, coupling of the front strut base end 62A of the front strut 62 to the lower jib 51 may be carried out such that the front strut base end 62A of the front strut 62 is coupled to the lower jib 51 before the rear strut 61 is placed on the front strut 62 in the preparation step. As a result of constructing the integrated unit 50 in advance in this manner, coupling the front strut base end 62A of the front strut 62 to the lower jib 51 on site is no longer necessary, in which case work efficiency at the site is improved. The integrated unit 50 having the rear strut 61 placed on the front strut 62 but the rear strut base end 61A not connected to the boom top 4T yet may be transported in such a condition. It is desirable in this case that before the boom top 4T of the integrated unit 50 is coupled to the upper boom 41 in the jib coupling step, the rear strut base end 61A be coupled to the boom top 4T.

In a state shown FIG. 2, the lower jib 51, the front strut 62, and the rear strut 61 may be coupled individually to the boom top 4T with the boom top 4T already coupled to the upper boom 41 in advance. In this case, these three members, i.e., the front strut 62 and the rear strut 61 that are placed on the lower jib 51, can be transported together as the integrated unit. It should be noted, however, that the lower jib 51, the front strut 62, and the rear strut 61 may be transported individually and connected to the boom top 4T in order at the work site.

When the front strut 62 and the rear strut 61 are both coupled to the jib base end 5A of the jib 5 or to the boom front end 4B of the boom 4, the order of connecting the front strut 62 and the rear strut 61 is not limited to a specific order.

Cylinder Connecting Step

Figure 3:
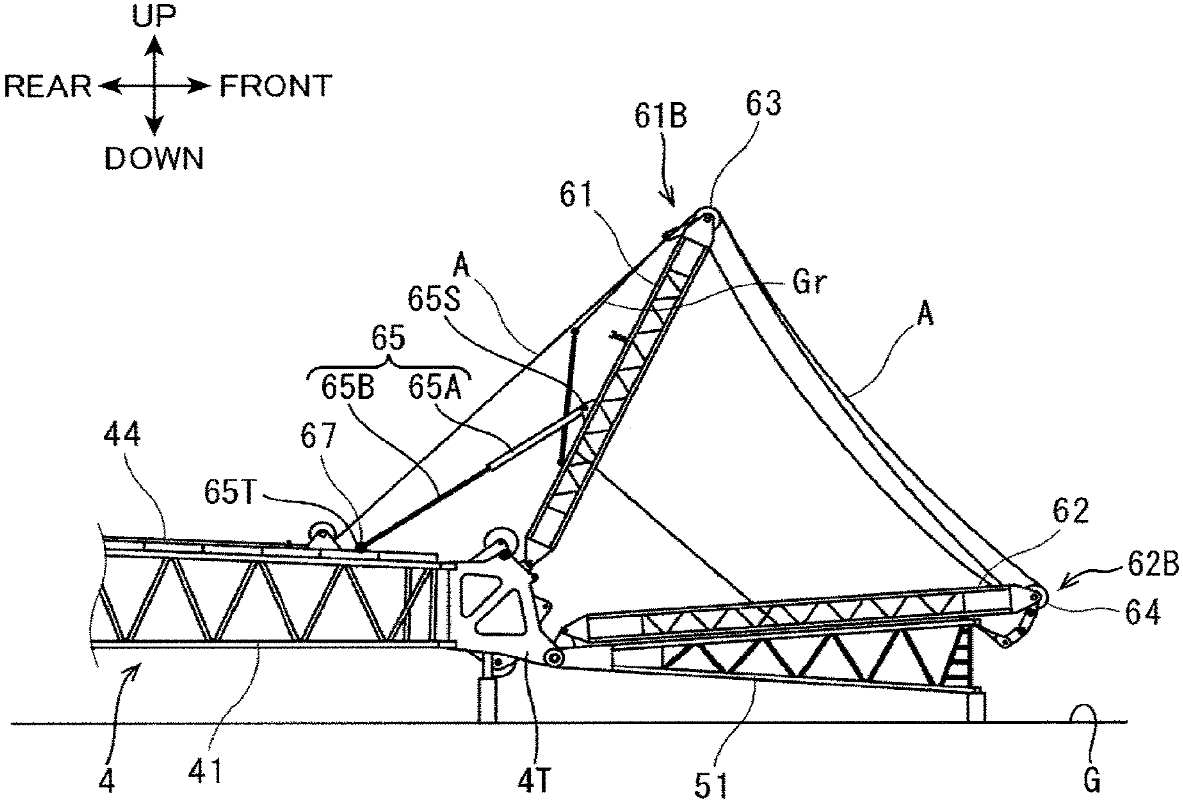
FIG. 3 is a schematic side view showing a step subsequent to the step shown in FIG. 2 of the assembly method for the crane according to the embodiment of the present invention.

In the cylinder connecting step, the cylinder unit 65 having the one end 65S supported on the rear strut 61 (one structure) and the other end 65T opposite to the one end 65S, the cylinder unit 65 being capable of extending/contracting, is extended to connect the other end 65T to the upper boom 41 of the boom 4 (another structure different from the one structure) (FIGS. 2 and 3). The one end 65S of the cylinder unit 65 is supported so as to be rotatable about a rotation center axis extending horizontally along the back surface of the rear strut 61. Similarly, the other end 65T of the cylinder unit 65 is connected so as to be rotatable about a rotation center axis extending horizontally along the back surface of the upper boom 41. The cylinder unit 65 may be attached to the rear strut 61 in a detachable manner.

The cylinder unit 65 is disposed on the hack side of the rear strut 61, and has a cylinder 65A and a piston 65B capable of moving linearly in the cylinder 65A. That the piston 65B comes out of and retreats in the cylinder 65A means that the cylinder unit 65 extends and contracts. It is preferable that the cylinder unit 65 be actuated by hydraulic pressure to extend and contract. A hydraulic power source for actuating the cylinder unit 65 may be a power source included in the crane 1 or a power source incorporated in the boom 4 or the like. It is nevertheless preferable that the power source be outside the crane 1. The power source being outside the crane 1 makes the configuration of the crane 1 simpler.

When the power source included in the crane 1 is used, hydraulic pipeline for the cylinder unit 65 is extended from the upper slewing body 3 and the like. In such a case, compared with the case of using the power source outside the crane 1, the cost of the crane 1 may become greater. When the power source is incorporated in the boom 4 or the like, an oil tank, a pump, a valve, a filter, and the like need to be incorporated additionally, together with the power source. In this case, compared with the case of using the power source outside the crane 1, the weight of the front end side of the boom 4 or of the base end side of the jib 5 becomes greater, which raises a concern that the stability of the crane 1 may be impaired or the performance of the crane 1 may drop. In addition, in a case where the power source incorporated in the boom 4 or the like is removed after the crane 1 is assembled, removing the power source adds extra work to existing work. Thus, compared with the case of using the power source outside the crane 1, work efficiency may become lower. Further, because the power source is a heavy object, mounting or removing the power source is not easy work, and therefore work efficiency may further drop because of such work. It should be noted, however, that the above cases of using the power source each offer major effects of the present invention.

The cylinder unit 65 is not limited to a specific unit. Any cylinder unit having an ability to raise the rear strut 61 may be adopted as the cylinder unit 65. A part where the one end 65S of the cylinder unit 65 is connected to the rear strut 61 and a part where the other end 65T of the cylinder unit 65 is connected to the boom 4 are not limited to specific parts. These parts are selected in an appropriate manner, according to the capability of the cylinder unit 65 and a maximum length to which the cylinder unit 65 can extend.

It is preferable that, as it will be described later, the cylinder unit 65 be used as a strut backstop in the assembled crane. It is therefore preferable that the cylinder unit 65 and the connection parts thereof be selected as using the cylinder unit 65 as the strut backstop is taken into consideration.

When the lower jib 51 with the rear strut 61 and front strut 62 placed on its back side is prepared, the cylinder unit 65 with its one end 65S already connected to the rear strut 61 may be prepared. Alternatively, the one end 65S of the cylinder unit 65 may be connected to the rear strut 61 on site and then the other end 65T may be connected to the upper boom 41. A method of connecting the other end 65T to the upper boom 41 is not limited to a specific method. For example, a boom engagement hole is fora led on the other end 65T while a cylinder engagement hole is formed on a given part of the back side of the upper boom 41 and an engagement pin is fitted through the boom engagement hole and the cylinder engagement hole to connect the other end 65T to the upper boom 41. The form of connecting (fixing) the other end 65T of the cylinder unit 65 to the upper boom 41 is not limited to connection by the pin as described above. Fixing tools different from the pin may also be used.

When the lower jib 51 with the rear strut 61 and front strut 62 placed on its back side is connected to the boom top 4T (boom 4) and the rear strut 61 is supported by the support 66 such that a straight line extending from the rear strut base end 61A of the rear strut 61 to the rear strut front end 61B makes an elevation angle against a horizontal plane, an angle the boom 4 and the rear strut 61 make is smaller than 180 degrees. In this state, extension of the cylinder unit 65 allows the other end 65T to easily reach the back side of the upper boom 41 (FIG. 2).

Figure 6:
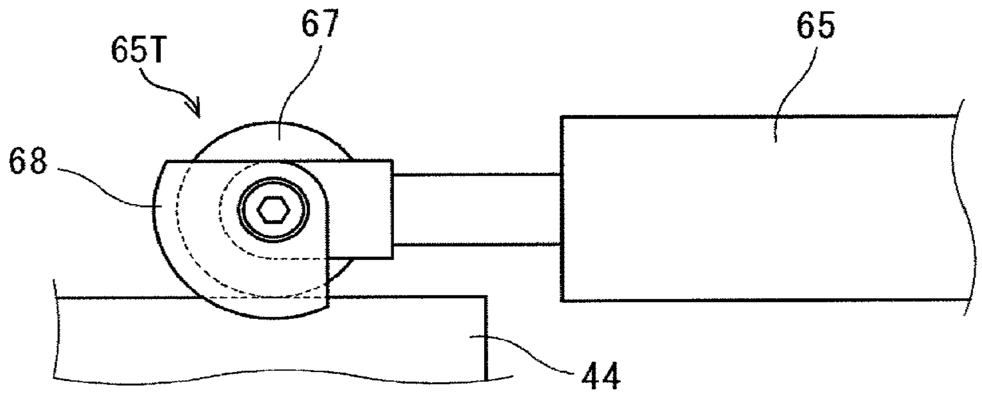
FIG. 6 is a schematic side view of a rail, a guide, and a roller that are used in the assembly method for the crane according to the embodiment of the present invention.

It is more preferable that a rail 44 on which the other end 65T of the cylinder unit 65 moves be laid on the boom 4 (rail laying step). Specifically, the rail 44 on which the other end 65T of the cylinder unit 65 can move is laid on the back side of the boom 4, and, in the cylinder connecting step, the extended cylinder unit 65 extends further with the other end 65T of the cylinder unit 65 remaining in contact with the rail 44. It is preferable that the other end 65T keep moving on the rail 44 until reaching a position at which the other end 65T is connected to the boom 4 (FIGS. 3 and 6). According to such a configuration, the other end 65T can easily and certainly be located at a position at which the other end 65T is coupled to the upper boom 41.

It is preferable, in the rail laying step, that the rail 44 or the other end 65T of the cylinder unit 65 be provided with a guide 68. In the cylinder connecting step, the guide 68 guides the other end 65T of the cylinder unit 65 onto the rail 44. Specifically, when the other end 65T of the cylinder unit 65 is provided with the guide 68 (FIG. 6), a pair of plate-like members serving as the guide 68 are attached to the other end 65T of the cylinder unit 65, the pair of plate-like members being arranged across a gap therebetween that is slightly longer (wider) than the length of the rail 44 in its width direction. When the cylinder unit 65 extends to bring the other end 65T closer to the rail 44, this guide 68 guides the other end 65T onto the rail 44 by holding edges of the rail 44 in the width direction from both sides. The pair of plate-like members may be set substantially parallel to the direction of extension/contraction of the cylinder unit 65, or may be set such that the gap between the plate-like members gets smaller as the plate-like members become closer to the other end 65T of the cylinder unit 65 but gets larger gradually as the plate-like members become further away from the other end 65T so that the gap between front ends of the plate-like members remains larger than the width of the rail 44. According to such a configuration, when the other end 65T moves closer to the rail 44, the guide 68 certainly guides the other end 65T onto the rail 44. In addition, the guide 68 prevents the other end 65T moving on the rail 44 from falling off from the rail 44. When the rail 44 is provided with the guide 68, a pair of walls orthogonal to the surface of the rail 44, the pair of walls serving as the guide 68, are disposed respectively on both edges of the rail 44 in the width direction. According to such a configuration, when the other end 65T moves closer to the rail 44, the other end 65T moves into a gap between the pair of walls of the guide 68. This allows the guide 68 to guide the other end 65T certainly onto the rail 44 and to prevent the other end 65T moving on the rail 44 from falling off from the rail 44.

It is preferable, in the cylinder connecting step, that the cylinder unit 65 be provided with a roller 67 on the other end 65T, the roller 67 being capable of rolling on the rail 44. According to such a configuration, in the cylinder connecting step, extension of the cylinder unit 65 causes the roller 67 to roll on the rail 44 until the other end 65T of the cylinder unit 65 reaches the position at which the other end 65T is connected to the boom 4. This makes it easier for the other end 65T to move on the rail 44. The roller 67 may be replaced with a member of a substantially spherical shape, a member of an arcuate shape in a side view, or the like, the member being capable of rolling in response to a change in the position of the cylinder unit 65, and such a member may slide or move slidably on the rail 44.

Rear Strut Raising Step

Figure 4:
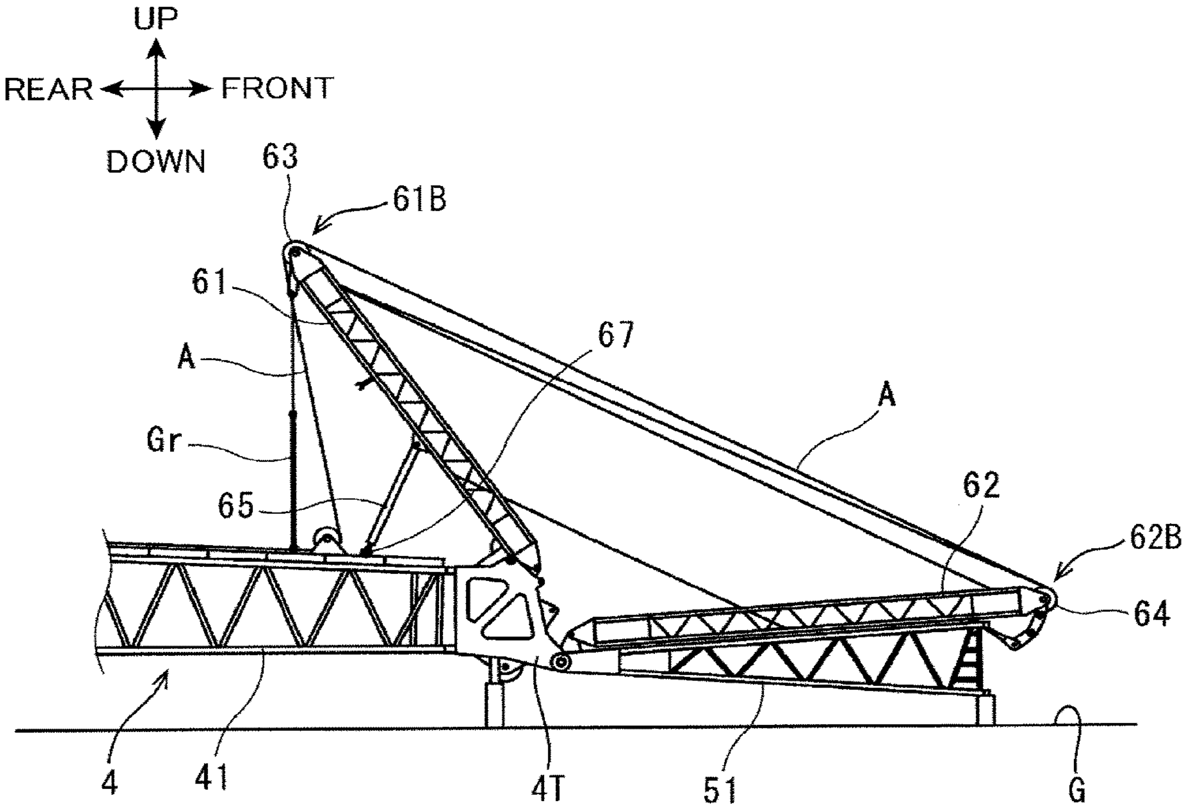
FIG. 4 is a schematic side view showing a step subsequent to the step shown in FIG. 3 of the assembly method for the crane according to the embodiment of the present invention.

In the rear strut raising step, the cylinder unit 65 is cause to contract, which raises the rear strut 61 (FIGS. 3 and 4). Specifically, the cylinder unit 65 having its both ends connected respectively to the rear strut 61 and the upper boom 41 is caused to contract. This contraction of the cylinder unit 65 causes the rear strut 61 to rotate about a coupling part (rear strut base end 61A) where the rear strut 61 is coupled to the upper boom 41, that is, raises the rear strut 61. The rear strut 61 is raised as the luffing cable A stretched between the sheave 63 of the rear strut 61 and the sheave 64 of the front strut 62 is reeled out.

Strut Supporting Step (Line Tensioning Step)

Figure 5:
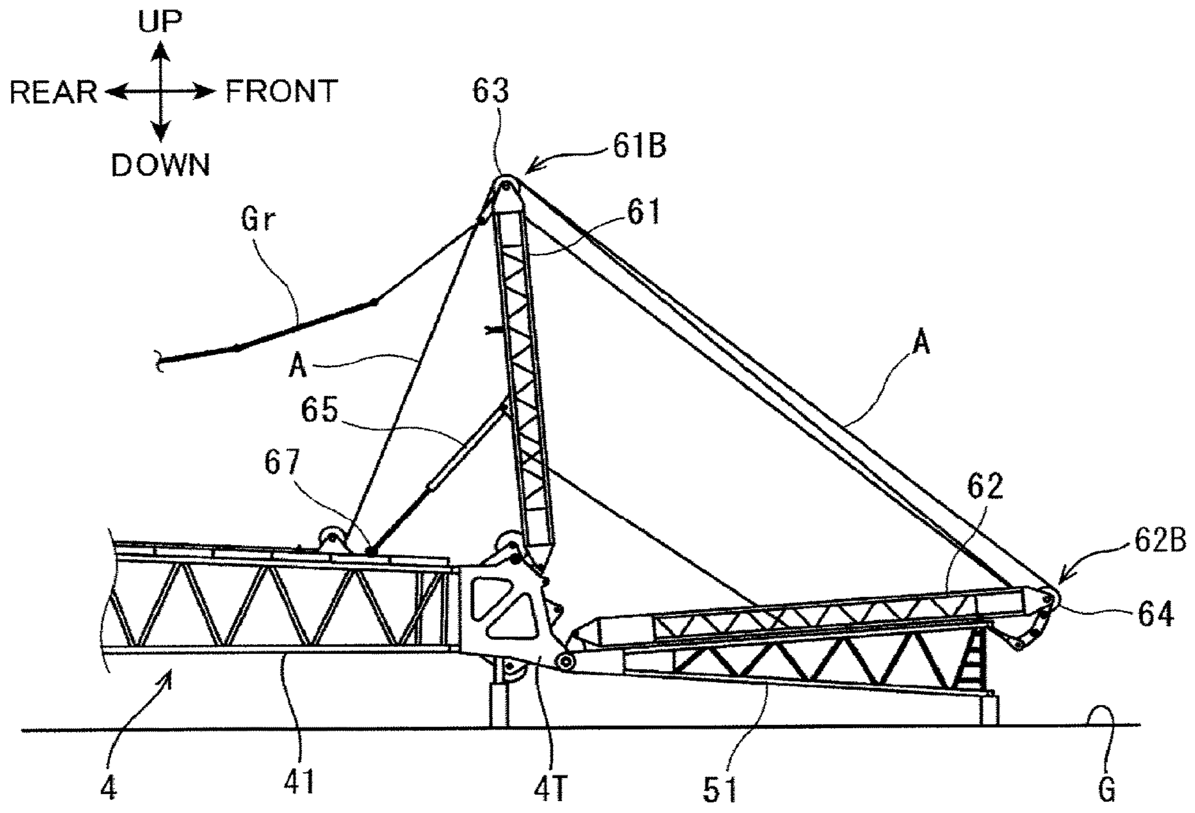
FIG. 5 is a schematic side view showing a step subsequent to the step shown in FIG. 4 of the assembly method for the crane according to the embodiment of the present invention.

In the strut supporting step, the rear side guy line Gr or the luffing cable (both of which are stretching members) is stretched between the rear strut front end 61B of the rear strut 61 and a base end side of the boom 4 (a specific part of boom 4 that is closer to the boom base end 4A than the boom front end 4B, that is, according to this embodiment, the lower boom 43), and tension is given to the rear side guy line Gr or the luffing cable to keep it tensioned (FIG. 5). Specifically, the rear strut 61 is raised to a position at which the back side of the rear strut 61 and the back side of the upper boom 41 make an acute angle in a side view, and a part of rear side guy line Gr or luffing cable that extends from the vicinity of the base end of the boom 4 and the rest of rear side guy line Gr or luffing cable that is connected to the front end side of the rear strut 61 are connected to each other. In the case of the luffing cable, one end of the luffing cable fed by the jib luffing winch is put over the rear strut front end 61B of the rear strut 61. Thereafter, the cylinder unit 65 is extended to determine the angle the back side of the rear strut 61 and the back side of the upper boom 41 make to be a desired angle. This gives tension to the rear side guy line Gr or the luffing cable connected in the above manner, thus allowing the rear strut 61 to be supported in its raised state.

Front Strut Raising Step

In the front strut raising step, the luffing cable A stretched between the sheave 63 (rear strut front end 61B) of the rear strut 61 and the sheave 64 (front strut front end 62B) of the front strut 62 is taken up to raise the front strut 62 toward the rear strut 61.

Specifically, the luffing cable A stretched between the sheave 63 of the rear strut 61, which is supported (fixed) by the rear side guy line Gr or the luffing cable in the above manner, and the sheave 64 of the front strut 62, which is laid down, is taken up. This causes the front strut 62 to rotate about a coupling part (front strut base end 62A) where the front strut 62 is coupled to the lower jib 51, that is, raises the front strut 62.

When the luffing cable is stretched between the boom base end 4A of the boom 4 and the rear strut front end 61B of the rear strut 61, the luffing cable is temporarily put over the sheave 64 (front strut front end 62B) of the front strut 62 in the laid down state or a different cable is connected to the luffing cable and this different cable is put over the sheave 64. Subsequently, the luffing cable is taken up, which causes the front strut 62 to rotate about the coupling part where the front strut 62 is coupled to the lower jib 51, that is, raises the front strut 62.

Boom Raising Step

It is preferable that the assembly method for the crane further include a boom raising step. In the boom raising step, the boom 4 is raised against the upper slewing body 3 with the cylinder unit 65 being interposed between the rear strut 61 and the boom 4 so that the cylinder unit 65 functions as the strut backstop that prevents the rear strut 61 from falling backward. As a result, when the crane 1 is used, the rear strut 61 can be supported stably by the cylinder unit 65.

Advantages

As described above, according to the assembly method for the crane of this embodiment, both ends (the one end 65S and the other end 65T) of the cylinder unit 65 are connected respectively to the rear strut 61 and the boom 4, and the cylinder unit 65 is caused to contract to raise the rear strut 61. The crane 1, therefore, can be assembled easily. In addition, providing the crane 1 with a link mechanism or the like for raising the rear strut 61 is unnecessary. This reduces the cost of the crane 1, and, since ancillary equipment for raising the rear strut 61 is unnecessary, makes assembling of the crane 1 easy. Furthermore, after the crane 1 is assembled, the cylinder unit 65 with its both ends connected to the rear strut 61 and the boom 4 can be directly used as the strut backstop. This further reduces the cost of the crane 1 and makes assembling of the crane 1 easy as well.

According to the assembly method for the crane of this embodiment, the lower jib 51 is coupled to the upper boom 41 (boom top 4T), and the rear strut 61 and the front strut 62 are raised by the cylinder unit 65. Work of raising the rear strut 61 and the front strut 62 is therefore accompanied by work of assembling the jib 5 (work of coupling the jib 5 to the boom 4), which reduces a time required for assembling the crane 1.

It is preferable that the assembly method for the crane according to this embodiment include the jib coupling step of placing the front strut 62 and the rear strut 61 in order on the lower jib 51, transporting the lower jib 51, and coupling the lower jib 51 to the boom 4. This jib coupling step reduces transportation costs, and facilitates coupling of the rear strut 61 to the boom 4 as well. As described above, the lower jib 51, the boom top 4T, the rear strut 61, and the front strut 62 may be transported together as the integrated unit 50. In this case, by coupling the boom top 4T making up the integrated unit 50 to the upper boom 41, the rear strut 61 and the front strut 62 can be coupled easily to the boom 4.

It is also preferable that the support 66 via which the front strut 62 supports the rear strut 61 be disposed between the front strut 62 and the rear strut 61. According to such a configuration, when the rear strut base end 61A of the rear strut 61 is connected to the boom top 4T, the front end side of the rear strut 61 is located relatively above the base end side thereof. As a result, when the cylinder unit 65 is extended, the other end 65T of the cylinder unit 65, the other end 65T being on the side of cylinder unit 65 that is connected to the upper boom 41, is able to easily reach the back side of the upper boom 41.

By laying the rail 44 on the boom 4, the other end 65T of the cylinder unit 65 can easily be moved to the coupling position where the other end 65T is coupled to the boom 4. The rail 44 or the other end 65T of the cylinder unit 65 is provided with the guide 68, which can guide the other end 65T onto the rail 44. The other end 65T is thus certainly guided onto the rail 44 and does not fall off from the rail 44. Hence coupling the other end 65T of the cylinder unit 65 to the boom 4 is made further easier. Providing the other end 65T of the cylinder unit 65 with the roller 67 allows the other end 65T to move on the rail 44 more easily. As a result, coupling the other end 65T of the cylinder unit 65 to the boom 4 is made further easier.

The configuration of the crane of FIG. 1 according to this embodiment is the configuration of an ordinary luffing jib crane. The assembly method for the crane does not require the crane to have a special configuration, and only requires preparation of the cylinder unit 65 connectable to the strut 6 and the boom 4. The assembly method for the crane, therefore, can be widely applied to assembling of general luffing jib cranes, thus offering highly versatile applicability.

Other Embodiments

The above embodiment does not limit configurations according to the present invention. Constituent elements making up aspects of the above embodiment, therefore, may be omitted or replaced or an extra constituent element may be added to the embodiment, based on the description made herein and common technical knowledge, and such omission, replacement, and addition should be interpreted as modifications falling within the scope of the present invention.

According to the above embodiment, in the assembly method for the crane, the boom having the lower boom and the intermediate boom has been described. This boom, however, may be a boom of a telescopic type.

According to the above embodiment, in the assembly method for the crane, the crane including the strut 6 having the rear strut 61 and the front strut 62 has been described. This crane, however, may be a crane having only one strut.

According to the above embodiment, in the assembly method for the crane, the rear strut 61 coupled to the boom front end 4B of the boom 4 and the front strut 62 coupled to the jib base end 5A of the jib 5 have been described. However, both of the struts may be coupled to the boom front end 4B of the boom 4 or to the jib base end 5A of the jib 5.

According to the above embodiment, in the assembly method for the crane, the guide 68 formed of the plate-like members has been described. The guide 68, however, is not limited to the one formed of the plate-like members but any member capable of guiding the other end 65T of the cylinder unit 65 onto the rail 44 may be used as the guide 68.

The cylinder unit 65 may be configured such that the one end 65S is supported by the boom 4 (one structure) while the other end 65T is connected to the rear strut 61 (strut 6) (the other structure) as a result of extension of the cylinder unit 65.

The cylinder unit 65 may be removed after the strut raising step and the strut supporting step of the rear strut 61.

A connection member connecting the rear strut front end 61B of the rear strut 61 to the front strut front end 62B of the front strut 62 is provided as a jib luffing rope when the front strut 62 rotates relative to the rear strut 61, and is provided as a strut coupling member when the front strut 62 and the rear strut 61 rotate together.

The assembly method for the crane according to the present invention can also be applied to assembling of a tower crane whose boom 4 does not rise and fall during operation of the tower crane.

The assembly method for the crane according to the present invention is preferably applied to assembling of a large luffing jib crane.

The present invention provides an assembly method for a crane. The crane includes: a lower travelling body capable of travelling on a travelling surface; an upper slewing body on the lower travelling body, the upper slewing body being slewably supported by the lower travelling body within a plane parallel to the travelling surface; a boom having a boom base end coupled to the upper slewing body and a boom front end located opposite to the boom base end, the boom being supported by the upper slewing body so as to be capable of rising and falling; a jib having a jib base end coupled to the boom front end and a jib front end located opposite to the jib base end and supporting a load-suspending cable, the jib being supported by the boom so as to be capable of rising and falling; and at least one strut having a strut base end rotatably coupled to the jib base end or the boom front end, the at least one strut having a strut front end located opposite to the strut base end, the strut front end being connected to the jib front end at least via a front side guy line. The assembly method for the crane includes a strut coupling step, a cylinder connecting step, a strut raising step, and a strut supporting step.

In the strut coupling step, the strut base end of the at least one strut is coupled rotatably to the jib base end or the boom front end.

In the cylinder connecting step, a cylinder unit having one end supported by one structure that is one of the at least one strut and the boom, and the other end opposite to the one end, the cylinder unit being capable of extending/contracting, is extended to connect the other end of the cylinder unit to the other structure that is one of the at least one strut and the boom and different from the one structure.

In the strut raising step, the cylinder unit is caused to contract to raise the at least one strut with the strut base end as a fulcrum.

In the strut supporting step, a stretching member is stretched between the strut front end of the at least one strut and a specific part of the boom, the specific part being closer to the boom base end than the boom front end, to support the at least one strut in a raised state.

According to the assembly method for the crane, the cylinder unit having its one end connected to the strut is extended to connect the other end of the cylinder unit to the boom, and then the cylinder unit is caused to contract to raise the strut. This makes raising the strut easy, allowing the strut to be rotated to rise up without requiring a dedicated link mechanism or the like. By stopping extension of the cylinder unit, the strut can be set in a raised position at a desired angle. As a result, connecting and tensioning a stretching member, such as a guy line and a luffing cable, becomes easy. When the strut has a rear strut and a front strut, the front strut can be raised easily by taking up the luffing cable after the strut supporting step.

It is desirable that the above method further include a rail laying step of laying a rail on the other structure, and that the cylinder connecting step include causing the other end of the cylinder unit to keep moving on the rail as a result of extension of the cylinder unit until reaching a position where the other end is connected to the other structure.

It is desirable, according to the above method, that the rail laying step include providing the rail or the other end of the cylinder unit with a guide, and that the cylinder connecting step include guiding the other end of the cylinder unit onto the rail by the guide.

It is desirable, according to the above method, that the cylinder connecting step further include using the cylinder unit having the other end provided with a roller, and that the cylinder connecting step includes causing the roller to keep rolling on the rail as a result of extension of the cylinder unit until the other end of the cylinder unit reaches a position where the other end is connected to the other structure.

It is desirable, according to the above method, that the at least one strut include: a front strut having a front strut base end coupled rotatably to the jib base end or the boom front end and a front strut front end located opposite to the front strut base end, the front strut front end being connected to the jib front end via a front side guy line; and a rear strut having a rear strut base end coupled rotatably, at the rear of the front strut base end, to the jib base end or the boom front end and a rear strut front end located opposite to the rear strut base end, the rear strut front end being connected to the front strut front end via a connection member, that the strut coupling step include rotatably coupling each of the front strut base end and the rear strut base end to the jib base end or to the boom front end, that the cylinder connecting step include, with the one end of the cylinder unit being supported by the one structure out of the rear strut and the boom, extending the cylinder unit to connect the other end of the cylinder unit to the other structure out of the rear strut and the boom, that the strut raising step include causing the cylinder unit to contract to raise the rear strut with the rear strut base end as a fulcrum, and that the stretching step include stretching the stretching member between the rear strut front end and the specific part of the boom and giving tension to the stretching member to support the rear strut in a raised state.

It is preferable that the above method further include a boom raising step of raising the boom with respect to the upper slewing body with the cylinder unit being interposed between the at least one strut and the boom so that the cylinder unit functions as a strut backstop that prevents the at least one strut from falling backward.

As described above, by the assembly method for the crane according to the present invention, a large crane including a strut can be assembled easily.

The invention claimed is:

1. An assembly method for a crane which includes:

a lower travelling body capable of travelling on a travelling surface;

an upper slewing body on the lower travelling body, the upper slewing body being slewably supported by the lower travelling body within a plane parallel to the travelling surface;

a boom having a boom base end coupled to the upper slewing body and a boom front end located opposite to the boom base end, the boom being supported by the upper slewing body so as to be capable of rising and falling;

a jib having a jib base end coupled to the boom front end and a jib front end located opposite to the jib base end and supporting a load-suspending cable, the jib being supported by the boom so as to be capable of rising and falling; and at least one strut having a strut base end rotatably coupled to the jib base end or the boom front end, the at least one strut having a strut front end located opposite to the strut base end, the strut front end being connected to the jib front end at least via a front side guy line, the method comprising:

a strut coupling step of rotatably coupling the strut base end of the at least one strut to the jib base end or the boom front end;

a cylinder connecting step of extending a cylinder unit having one end supported by one structure that is one of the at least one strut and the boom, and the other end opposite to the one end, the cylinder unit being capable of extending/contracting, to connect the other end of the cylinder unit to the other structure that is one of the at least one strut and the boom and different from the one structure;

a strut raising step of causing the cylinder unit to contract to raise the at least one strut with the strut base end as a fulcrum;

a strut supporting step of stretching a stretching member between the strut front end of the at least one strut and a specific part of the boom, the specific part being closer to the boom base end than the boom front end, to support the at least one strut in a raised state; and a rail laying step of laying a rail on the other structure, wherein the cylinder connecting step includes causing the other end of the cylinder unit to keep moving on the rail as a result of extension of the cylinder unit until reaching a position where the other end is connected to the other structure.

2. The assembly method for a crane according to claim 1, wherein the rail laying step includes providing the rail or the other end of the cylinder unit with a guide, and the cylinder connecting step includes guiding the other end of the cylinder unit onto the rail by the guide.

3. The assembly method for a crane according to claim 1, wherein the cylinder connecting step further include using the cylinder unit having the other end provided with a roller, and the cylinder connecting step includes causing the roller to keep rolling on the rail as a result of extension of the cylinder unit until the other end of the cylinder unit reaches a position where the other end is connected to the other structure.

4. The assembly method for a crane according to claim 1, wherein the at least one strut includes:

a front strut having a front strut base end coupled rotatably to the jib base end or the boom front end and a front strut front end located opposite to the front strut base end, the front strut front end being connected to the jib front end via a front side guy line; and a rear strut having a rear strut base end coupled rotatably, at rear of the front strut base end, to the jib base end or the boom front end and a rear strut front end located opposite to the rear strut base end, the rear strut front end being connected to the front strut front end via a connection member, the strut coupling step includes rotatably coupling each of the front strut base end and the rear strut base end to the jib base end or to the boom front end, the cylinder connecting step includes, with the one end of the cylinder unit being supported by the one structure out of the rear strut and the boom, extending the cylinder unit to connect the other end of the cylinder unit to the other structure out of the rear strut and the boom, the strut raising step includes causing the cylinder unit to contract to raise the rear strut with the rear strut base end as a fulcrum, and the stretching step includes stretching the stretching member between the rear strut front end and the specific part of the boom and giving tension to the stretching member to support the rear strut in a raised state.

5. The assembly method for a crane according to claim 1, the method further comprising a boom raising step of raising the boom with respect to the upper slewing body with the cylinder unit being interposed between the at least one strut and the boom so that the cylinder unit functions as a strut backstop that prevents the at least one strut from falling backward.

* * * * *